Oct. 21, 1952     B. ROBERTS     2,614,401
TOP ACCESS REFRIGERATOR AND COVER THEREFOR

Filed July 23, 1949     3 Sheets-Sheet 1

INVENTOR.
BERNARD ROBERTS.
BY Charles A. Morton
Attorney.

Oct. 21, 1952          B. ROBERTS          2,614,401
TOP ACCESS REFRIGERATOR AND COVER THEREFOR
Filed July 23, 1949          3 Sheets-Sheet 2
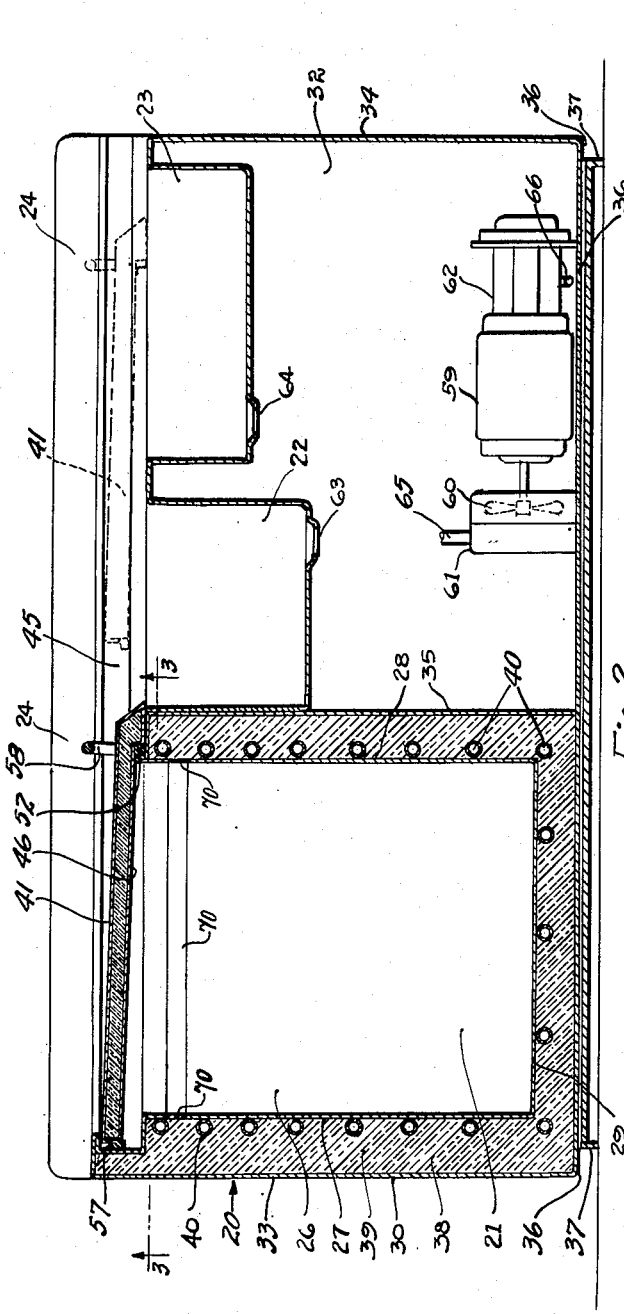
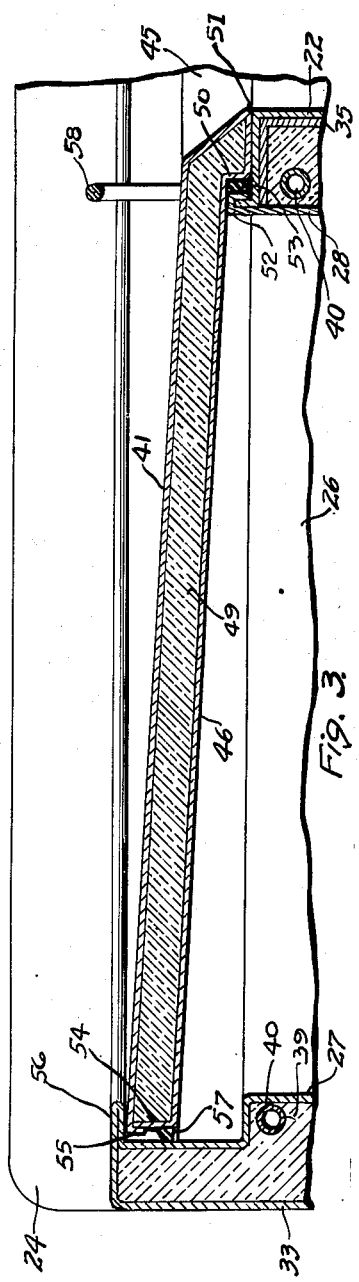
INVENTOR.
BERNARD ROBERTS
BY Charles A. Morton
Attorney Oct. 21, 1952  B. ROBERTS  2,614,401
TOP ACCESS REFRIGERATOR AND COVER THEREFOR
Filed July 23, 1949  3 Sheets-Sheet 3
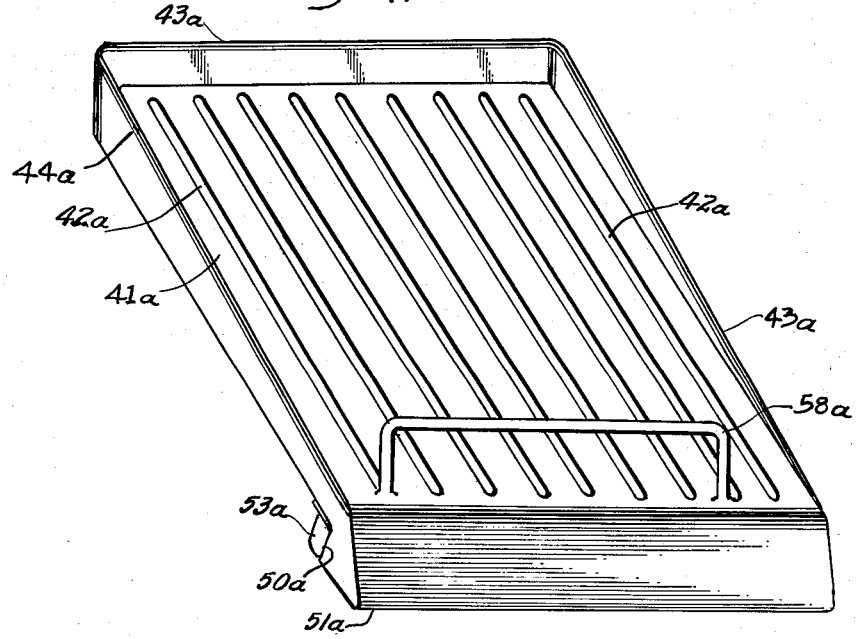
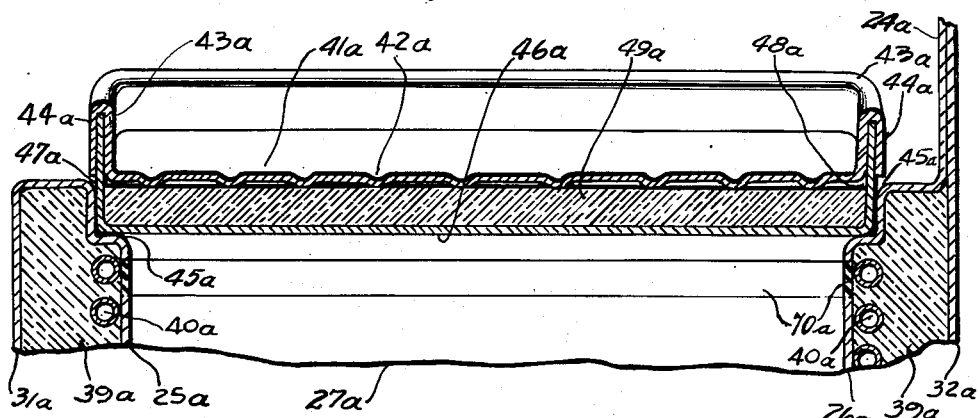
INVENTOR.
BERNARD ROBERTS
BY Charles A. Morton
Attorney.

Patented Oct. 21, 1952

2,614,401

UNITED STATES PATENT OFFICE 2,614,401

TOP ACCESS REFRIGERATOR AND COVER THEREFOR

Bernard Roberts, Bronx, N. Y.

Application July 23, 1949, Serial No. 106,469

9 Claims. (Cl. 62—116)

This invention relates to a sink and food-freezing storage unit, and is particularly adapted for use in a kitchen where the available cabinet space is limited.

One object of this invention is a sink and food-freezing storage unit which employs the kitchen space to maximum advantage.

Another object is a sink and food-freezing storage unit which is compact and which variously utilizes a movable cover member in closed position as a drain board for the sink and as the closure member of the food-freezing compartment, and in open position as a sink cover and reception platform.

Another object is a sink and food-freezing storage unit which utilizes the space occupied by the freezer compartment, by the sink, and the "dead" space beneath the sink, to maximum advantage.

Another object is a compact sink and food-freezing storage unit suitable for use as one unit of a built-in lineup of base or counter-topped, kitchen cabinets.

Another object is a sink and food-freezing storage unit of but few and simple parts, which is compact, inexpensive to manufacture, readily assembled and installed, easy to maintain, and which is very efficient and durable in use.

Other objects will appear from the detailed description which follows:

In the drawings comprising three sheets of five figures, numbered Figs. 1 to 5 inclusive, one suggested embodiment of the invention is illustrated by way of example only.

Fig. 2 is a vertical sectional view taken along the line 2—2 of Fig. 1 looking in the direction of the arrows;

Fig. 3 is a vertical cross sectional view of a fragment of the deep-freeze compartment, taken along the line 3—3 of Fig. 2, looking in the direction of the arrows;

Fig. 4 is a perspective view of a modified form of cover member; and

Fig. 5 is a vertical cross sectional view of a fragment of a deep-freezing compartment, combined with the modified form of cover member of Fig. 4.

Like reference characters designate corresponding parts throughout the several figures of the drawings.

Figure 1:
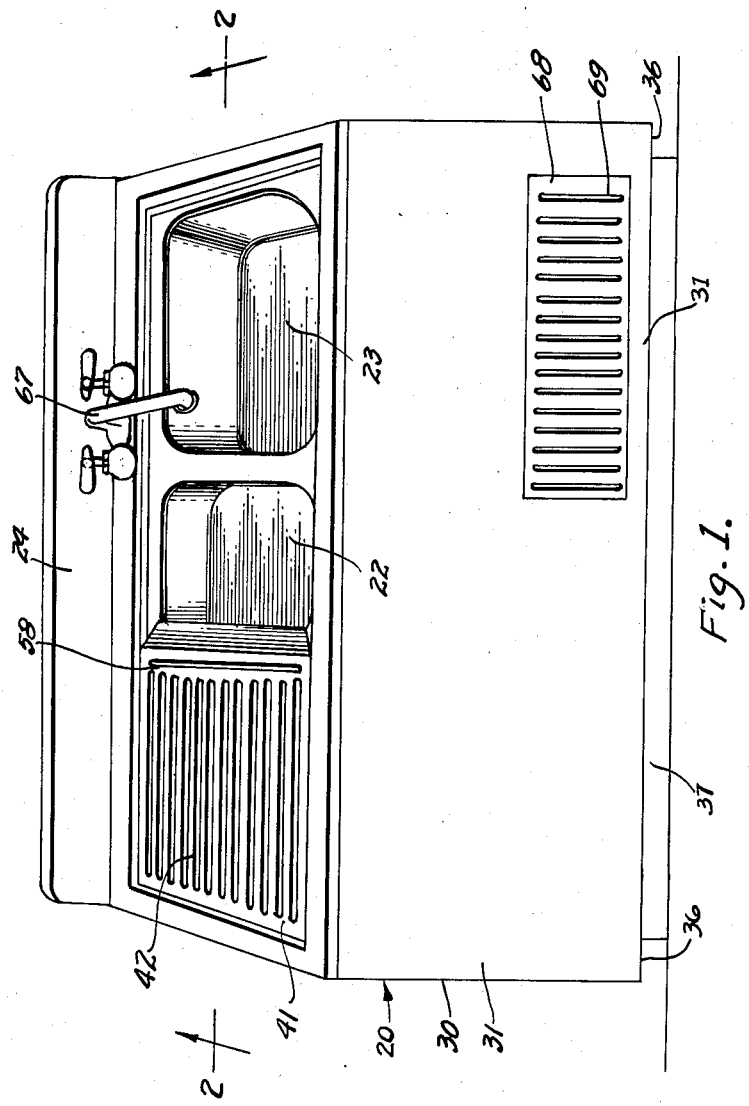
Fig. 1 is a general perspective view of a sink and food-freezing storage unit.

The base cabinet 20 (Fig. 1) which is of counter height, is preferably subdivided into two compartments so as to accommodate a storage well 21 for frozen food, and one or more sinks, such as the handy sink 22 and the large utility sink 23. An apron or back splash board 24 serves to protect the wall above the counter from soilage.

The food storage well 21 is enclosed upon all sides except the top, by walls of metal or other conductive material, including the conductive front wall 25a (Fig. 5), the conductive back wall 26, the conductive end walls 27 and 28, and the conductive bottom 29 (Fig. 2).

The food storage well 21 and the sink(s) 22 and/or 23, are positioned in and supported by an outer supporting case 30 consisting of the front and rear supporting walls 31 and 32 (Figs. 1 and 2), the end supporting walls 33 and 34, the partition wall 35, and a bottom wall or base 36 (Fig. 2). The partition wall 35 cross-braces the outer case 30 and subdivides it into two distinctive compartments, one for housing the food storage well 21, and the other for containing the sink(s). Outer case 30 may be supported upon a common base or pedestal 37, fashioned out of sections of channel iron or steel suitably welded or otherwise secured together, to form a pedestal frame.

The overall dimensions of the food storage well 21 are substantially less than the inside dimensions of the well-housing compartment formed in the outer case 30, so that when the food storage well 21 is housed in the well-housing compartment of the outer case 30, the space between the walls of the food storage well 21 and the walls of the outer case 30, defines a chamber 38 of substantial size which is large enough to contain a substantial thickness of an insulating material 39 thus substantially increasing the thermal resistance of the chamber and providing a sufficiently high and effective insulation to assure deep-freezing in the food storage well 21.

The conductive front, back, and end walls 25, 26, 27, and 28 of the frozen-food storage well 21 are separated from the corresponding front, rear, and end supporting walls 31, 32, and 33 of the outer supporting case 30 and from partition wall 35, by means of a circuit breaker 70 composed of a strip of any suitable nonconductive, waterproof material such as "Formica," "Bakelite," "Plexiglas," etc. The strip 70 may be either butt-jointed (Fig. 2), or form an overlapping joint, between each of the conductive walls of the well 21 and the corresponding supporting or partition wall, of the outer case 30.

The food storage well 21 may be fabricated either from refrigerator plates, or in any other form embodying the principle of the refrigerator plate type of construction, or a length of metal tubing may be wound in the form of a refrigerating coil 40 to enclose the conductive side walls and the conductive bottom wall 29 of the food storage well 21. The refrigerating coil 40 preferably abuts the conductive side walls and the conductive bottom, and extends around said walls and along said bottom in physical contact therewith, so as to cool or chill all parts of the conductive walls and of the conductive bottom of food storage well 21 rapidly and uniformly, thus tending to maintain all parts of the food storage well 21 at a substantially uniform low temperature, which during the normal operation of the deep-freezing unit, will be substantially below freezing point.

The food storage well 21 is provided with an insulated waterproof closure 41, containing insulating material 49 of high thermal resistance, the closure preferably being so designed that it may slide along the top of the supporting case 30, from closed to open, position. The waterproof insulated closure 41 may be structurally reinforced as by being encased between laminations of metal fashioned to form a drain board which may be provided with a series of corrugations 42 extending lengthwise of said drain board for draining any moisture collecting upon the drain board into the sink 22.

The drain board may be made of any suitable material such as steel, coated with porcelain or the like, having its peripheral marginal edge bent to form the downwardly depending flange 55. A cover lining 46, which likewise may be porcelain coated steel, is upwardly bent around its peripheral marginal edge to form the upstanding flange 54 whose free marginal edge is sealed by the overlying flange 55 of the drain board. The space between the drain board and the cover lining 46, defines a chamber of considerable depth for containing a sufficient thickness of insulating material 49 to effect high thermal resistance, and flange 55 co-operates with upstanding flange 54 of cover lining 46 to seal the insulating material 49 in the drain board chamber and form a rugged cover construction. The counter-top is suitably recessed above the well and sink openings to form a pair of oppositely disposed spaced parallel guide-channels 45 (Fig. 2), which extend lengthwise of the cabinet and overlie the well 21 and the sink(s) 22 and/or 23. The front and rear supporting walls 31 and 32 may be bent to form the guide-channels 45 wherein drain board 41 is mounted to slide from the closed position shown in bold lines in Fig. 2, to the open position substantially as shown in broken lines in said figure.

To insure an effective seal between drain board 41 and the wall of the well 21, the trailing edge of cover lining 46 (Fig. 3) is bent to form a step 50, and the outer edge or lip 51 of step 50 is suitably secured, as by welding, to the meeting edge of drain board 41. Cover lining 46 and drain board 41 may be formed out of one sheet of metal bent into the form shown in the drawings.

The upper marginal edge of the wall of well 21, disposed above the circuit breaker 70, may be bent to form an upstanding lip 52, and reversely bent to form a downwardly depending flange for overlapping and sealing the lip of the sink 22 (Fig. 3), as well as to form a stop for the step 50. The lateral flange of the sink 22 forms a seat for the bottom of the stepped edge of the drain board 41. A gasket 53 of suitable resilient insulating material such as rubber, is suitably attached in the angle of step 50 to form both an air tight seal between the step 50 of the drain board 41 and the lip 52 of the food storage well 21, and to act as a shock absorber when the drain board 41 slides into position to properly close the food storage well 21. The leading edge of cover lining 46 is also bent upwardly to form an upstanding flange 54 (Fig. 3) which is sealed by the downwardly extending overlapping flange 55. To effect a better seal between the leading edge of the closure 41 and the end wall of the food storage well 21 the upper edge of the end supporting wall 33 is bent over to form the laterally protruding flange 56, which overlaps the leading marginal edge of the drain board when closure 41 is fully closed. A gasket 57 of suitable elastic and insulating material such as rubber, is suitably secured to the leading edge of closure 41, as to the upstanding flange 54 of the drain board, to increase the sealing action and act as a shock absorber as the closure 41 slides into closing position above food storage well 21.

Any suitable means may be used for sliding the closure 41 in the guide channels 45. A handle 58 formed by suitably bending a rod of rust-proof metal such as stainless steel, or a nickel or chrome plated metal rod, gives good results.

One or more sinks, such as the handy sink 22 and the large utility sink 23, are mounted upon the outer supporting case 30, between the partition wall 35 and the end supporting wall 34, so as not to obstruct or interfere with the guide channels 45, so that when the drain board is moved towards the dotted line position shown in Fig. 2, the drain board will overlie the sink(s) 22 and/or 23 and thus be converted into a sink cover and a shelf or platform for temporarily accommodating foodstuffs in their passage to and from the food storage well 21.

The sink(s) 22 and/or 23 are provided with the usual waste outlets 63, 64 for plumbing connections to the drain pipe line.

The sink(s) 22 and/or 23 occupy the upper portion of one half-section of the cabinet space. In the lower portion of the same half-section of the cabinet and beneath the sink(s) 22 and/or 23, the compressor unit for the deep-freeze unit, is installed. This compressor unit includes the usual electric motor 59 for driving the fan 60 of the condenser 61, and the compressor 62. A section of pipe (not shown) detachably couples one end of the metal tubing of the refrigerating coils 40 to the high pressure pipe 65, and another section of pipe (not shown) detachably couples the opposite end of the metal tubing of the refrigerating coils 40 to the low pressure return pipe 66, of the compressor unit. A suitable thermostatic control system and the apparatus therefor (not shown) but which is well known in the art, is provided, for maintaining an accurate temperature control of the food storage well 21. The top of the sink, or the back splash 24, may be provided with suitable openings for mounting a combination faucet 67. The combination faucet 67 includes the usual hot and cold water control valves suitably piped to the hot and cold water lines (not shown) of the conventional house water supply system.

When the drain board 41 is in the bold line position of Fig. 2, the well 21 is effectively sealed, and the sink(s) 22 and/or 23 may be used for domestic purposes in the conventional way, and washed articles may be placed upon the drain board 41 to drain, any drainage flowing along the corrugations 42 back into the sink 22, thus simultaneously utilizing the cover 41 as a sealing cover for the food storage well 21 and as a sink drain board for the sink(s) 22 and/or 23. When access to the food storage well 21 is required, the drain board 41 is moved along the guide channels 45 to a position substantially as shown in dotted lines in Fig. 2, and articles of food may now be transferred from the food storage well 21 to the drain board 41 or vice versa, thus using the drainage board 41 as a temporary shelf or loading platform to conserve space, when storing food in, or removing it from, the food storage well 21.

By locating the compressor system unit beneath the sink(s), the deep-freezing portion of the unit is effectively used to maximum capacity, and at maximum efficiency as a food storage well, and the space beneath the sink(s) is also used effectively and is not wasted. Moreover the compressor unit is in a position where access thereto for repairs or for replacement thereof can be readily obtained without in any way disturbing the food storage function of, or the food stored in, the well 21. By this arrangement the low temperature of the food storage well 21 can be preserved for a substantial period of time, to permit the repair or replacement of the compressor unit.

Access to the compressor unit is obtained either by a door or by a removable panel 68, which is provided with a series of ventilating slots 69 for maintaining an effective circulation of air to the compressor unit.

Figs. 4 and 5 show a modified drain board construction, wherein the drain board and cover 41a, corrugated at 42a, is provided with a marginal edge which is bent and reversely bent to form the upstanding peripheral flange or lip 43a and the downwardly extending peripheral flange 44a, which overlies and effectively seals the oppositely disposed spaced upstanding flanges 47a and 48a of the cover lining 46a. The upstanding flange 43a and the downwardly extending flange 44a in conjunction form a channel in which the upstanding flanges 47a and 48a may register and be effectively sealed. The drain board and cover 41a, and the cover lining 46a, may be formed by suitably bending a single metal sheet, or it may be fabricated out of two separate metal sheets welded or otherwise secured together at 51a. The cover lining 46a is stepped at 50a, and a gasket 53a, of a suitable elastic and heat insulating material such as rubber, is secured in the angle formed by the step 50a. A substantial thickness of heat insulating material 49a is effectively sealed between and protected by the metal cover 41a and its lining 46a. An operating handle 58a is suitably welded or otherwise anchored to the drain board 41a.

Only so much of the deep-freeze cabinet is shown in Fig. 5 as is necessary to an understanding of the operation of the modified form of cover member. The reference numerals in Fig. 5 designate the correspondingly numbered parts of Figs. 1 to 3, but the alphabetical designation "a" has been suffixed to the otherwise correspondingly numbered part shown in the modified form (Fig. 5).

The splash board 24a merges with the rear wall 32a of the outer supporting case. The chamber formed between the conductive walls of the food storage well, including the front, back, and end walls 25a, 26a, and 27a thereof, and the walls of the outer supporting case, including the front and rear supporting walls 31a and 32a thereof, is filled with suitable heat insulating material 39a. The refrigerating coil 40a is in physical contact with the conductive walls (and bottom not shown) of the food storage well. A circuit-breaker 70a thermally insulates the supporting walls from the upper ends of the conductive walls of well 21, and the front and rear supporting walls are suitably stepped to define a pair of oppositely disposed spaced parallel guide-channels 45a—45a wherein the cover member (Fig. 4) is slidably supported (Fig. 5).

The use of laminations of metal for protecting the insulating material 41 may be dispensed with, provided the insulating material 49 is waterproof and stiff enough to be self-supporting.

The cover 41 may be subdivided into two half-sections mounted to slide one above the other, or said cover may be hingedly mounted upon the partition wall to swing to the left to seal the well or to the right to cover the sink.

As illustrated in the drawings a right hand cabinet is shown, but it should be understood that the invention is equally applicable to a left hand cabinet, in which case the sink(s) 22 and/or 23 would be positioned at the left end of the freeze-sink unit, or upon the opposite side of the frozen-food storage well 21 from that shown in Figs. 1 and 2.

Other modifications of the invention within the scope of the claims hereof, will be obvious to those skilled in the art.

What is claimed is:

1. In a cabinet of counter-height and in combination, an outer case substantially counter-high, said case being open at the top, a partition wall positioned within said case and extending from the front wall to the back wall thereof to subdivide said case into two adjoining compartments, said partition wall forming a wall common to both compartments, a deep-freezing food storage well positioned in one of said compartments, said well being open at the top and having side and end walls and a bottom wall otherwise completely enclosing said food-storage well, of lesser dimensions than said compartment thereby forming a chamber between the side, end and bottom walls of said well and the side walls, end wall, partition wall and bottom wall of said compartment, heat insulating material packed in said chamber to oppose passage of heat from said side, end, bottom and partition walls to the walls of said well, a sink positioned in said other compartment, the top edges of the side and end walls of said well and the mating edges of the corresponding walls of said outer case being spacedly separated from each other to define a gap, a strip of material of high thermal resistance positioned in and preventing conduction of heat across said gap, the top edges of said well and of said sink being disposed on substantially the same level, the walls of said cabinet, well, and sink, in conjunction, co-operating to define a spaced pair of oppositely disposed parallel guide-channels extending lengthwise of said cabinet and overlying said well and said sink, a hollow drain board defining a cover-member, the cavity in said cover-member being packed with heat insulating material to oppose passage of heat therethrough, said cover-member being slidably movable in said guide-channels to alternatively overlie either the mouth of the well or the sink opening, and said cover-member in one position thermally sealing the mouth of said well and defining a counter-top draining into said sink and in the other position forming a sink-cover and loading-platform for food to be stored in the well.

2. In a cabinet of counter-height and in combination, an outer case substantially counter-high, said case being completely open at the top, a partition wall positioned within said case and extending from the front wall to the back wall thereof to subdivide said case into two adjoining compartments, a deep-freezing food storage well positioned in one of said compartments, the side, end and bottom walls of said well being made of heat conductive material and being of lesser dimensions than the corresponding walls of said compartment to define a chamber between said well and said compartment when the former is positioned in the latter, a length of metal tubing wrapped around said well to form a refrigeration coil, the opposite ends of said coil extending through the partition wall into the adjoining compartment, heat insulating material enclosing said refrigeration coil and packed between said chamber walls to oppose passage of heat through said chamber, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, a sink positioned in said other compartment, the top edges of said well and of said sink being disposed on substantially the same level, a spaced pair of oppositely disposed parallel guide-channels formed in and extending lengthwise of said cabinet and overlying said well and said sink, a hollow drain board defining a cover-member, the cavity in said cover-member being packed with heat insulating material to oppose passage of heat therethrough, said cover-member being slidably movable in said guide-channels to alternatively overlie the mouth of the well and the sink opening, and said cover-member in one position thermally sealing the mouth of said well and defining a counter-top draining into said sink and in the other position forming a sink-cover and a loading-platform for food to be stored in, and removed from, the well.

3. In a cabinet of counter-height and in combination, an outer case substantially counter-high, said case being open at the top, a partition wall positioned within said case and extending from the front wall to the back wall thereof to subdivide said case into adjoining compartments, a food storage well positioned in one of said compartments, the side, end and bottom walls of said well being metallic and of lesser dimensions than the corresponding walls of said compartment thereby forming a chamber between said well and compartment when the former is positioned within the latter, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, a length of metal tubing wrapped around said well and extending across the bottom thereof to form a refrigeration coil, the opposite ends of said refrigeration coil extending through said partition wall into the adjoining chamber, heat insulating material filling the chamber between the well and its associated compartment to substantially increase the thermal resistance thereof, a sink positioned in said other compartment, a compressor positioned beneath said sink, pipe connections extending between the ends of said refrigeration coil and said compressor to provide a refrigeration system, the top edges of said well and of said sink being substantially level, a spaced pair of oppositely disposed parallel guide-channels extending lengthwise of said cabinet and overlying said well and said sink, a hollow drain board defining a cover-member, the cavity in said cover-member being packed with heat insulating material to oppose passage of heat therethrough, said cover-member being slidably movable in said guide-channels to alternatively overlie either the mouth of the well or the sink opening, and said cover-member in one position thermally sealing the mouth of said well and defining a counter-top draining into said sink and in the other position forming a sink-cover and a loading-platform for food to be stored in, and removed from, the well.

4. In a counter-cabinet and in combination, a counter-high outer-case, said case being open at the top, an inside partition wall extending from the front wall to the back wall of the case to subdivide it into two adjoining compartments, a food storage well positioned in one of said compartments, the side, end and bottom walls of said well being made of heat conductive material, said well walls being of lesser dimensions than the walls and bottom of said compartment to form a chamber defined by the walls of said well and of said compartment when the well is positioned in the compartment, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, a length of metal tubing wrapped around said well to form a refrigeration coil, the open ends of said tubing extending through the partition wall into the adjoining compartment, heat insulating material packed in said chamber to oppose passage of heat through said chamber, a sink positioned in said other compartment and supported by the walls of the outer-case, the rims of said well and said sink being disposed on substantially the same level, a cover-member comprising heat insulating material, said cover-member being movable to alternative positions, and said cover-member in one of said positions overlying the well to thermally seal the mouth thereof and to form a counter-top draining into said sink, and in the other of said positions overlying and covering the sink to form a loading-platform for the well.

5. In a counter-cabinet and in combination, a counter-high outer-case, said case being open at the top, a partition wall extending from the front wall to the back wall of the case to subdivide said case into two adjoining compartments, a food storage well positioned in one of said compartments, the side, end and bottom walls of said well being made of heat conductive material, said well being of lesser dimensions than said compartment so that when said well is positioned in said compartment a chamber confined by their respective walls is formed between them, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, means positioned in said chamber operable to reduce the temperature of said well below freezing point, said means being accessible through the partition wall from the adjoining compartment, heat insulating material packed in said chamber for insulating said well, the counter overlying said other compartment having a sink opening formed therein, the top edges of said well and of said sink opening being disposed on substantially the same level, a cover-member comprising heat insulating material, said cover-member being mounted to move to alternative positions, said cover-member in one of said positions overlying the well to thermally seal the mouth thereof and to form a counter-top draining into the sink opening, and in the other of said positions overlying and covering the sink opening and forming a loading-platform for the well.

6. In a cabinet of counter-height and in combination, a counter-topped outer-case, a partition wall subdividing said case into two adjoining compartments, a food storage well positioned in one of said compartments and accessible through the counter-top, the side, end and bottom walls of said well being made of heat conductive material, said well being of lesser dimensions than said compartment so that when said well is positioned in said compartment a chamber is formed between them defined by and confined within their respective walls, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, means operable to reduce the temperature of said well substantially below freezing point, said temperature reducing means being accessible through the partition wall and controllable from the adjoining compartment, heat insulating material packed in said chamber for insulating said well, a sink opening formed in the counter-top overlying the adjoining compartment, the top edges of said well and of said sink opening being disposed on substantially the same level, a cover-member comprising heat insulating material, said cover-member being mounted to move to alternative positions in said counter-top, said cover-member in one of said positions overlying the well to thermally seal the mouth thereof and to drain said counter-top towards the sink opening, and said cover-member in said other position overlying and covering the sink opening to convert the counter-top into a loading-platform for the well.

7. In a cabinet of counter-height and in combination, an outer case, the top of said case being open, said opening being substantially counter-high, a partition wall extending from the front wall to the back wall of said case to subdivide it into two adjoining compartments, a food storage well positioned in one of said compartments and accessible through said counter-top opening, the walls of said well being metallic, said well being of lesser dimensions than said compartment so that when said well is positioned within said compartment a chamber is formed between them defined by and confined within their respective walls, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, a length of metal tubing wrapped around said well and extending across the bottom thereof to form a refrigeration coil, the opposite ends of said refrigeration coil extending through said partition wall and opening into the adjoining chamber, heat insulating material positioned between said refrigeration coil and the outer wall of said chamber to substantially increase the thermal resistance of said chamber, a sink positioned in said other compartment, a compressor positioned beneath said sink, pipe connections extending between the ends of said refrigeration coil and said compressor to complete a closed refrigeration system, the top edges of said well and of said sink being substantially level, a spaced pair of oppositely disposed parallel guide-channels extending lengthwise of said cabinet and overlying said well and said sink, a hollow cover-member, the cavity in said cover-member being packed with heat insulating material to increase the thermal resistance of said cover-member, said cover-member being slidably movable in said guide-channels to alternatively overlie either the mouth of the well or the sink opening, and said cover-member in one position thermally sealing the mouth of said well and defining a drain board draining into said sink and in the other position forming a sink-cover and a loading-platform for the well.

8. In a counter-cabinet and in combination, an outer case substantially counter-high, said case being open at the top, a partition wall subdividing said case from front to back into two adjoining compartments, a food storage well positioned in one of said compartments and accessible through the open top thereof, the walls of said well being metallic, said well being of lesser dimensions than said compartment so that when said well is positioned in said compartment a chamber is formed extending from the walls of the well to the walls of the compartment, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, means positioned in said chamber operable to reduce the temperature of said well substantially below freezing point, said temperature reducing means being accessible through said partition wall from the adjoining chamber, heat insulating material extending between said temperature reducing means and the outer wall of said chamber to substantially increase the thermal resistance of said chamber, a sink positioned in said other compartment, a compressor positioned beneath said sink, pipe connections extending between the ends of said temperature reducing means and said compressor to provide a closed refrigeration system, the top edges of said well and of said sink being substantially level, a hollow cover-member, the cavity in said cover-member being packed with heat insulating material to increase the thermal resistance of said cover-member, said cover-member being mounted to move to alternatively overlie either the mouth of the well or the sink opening, and said cover-member in one position thermally sealing the mouth of said well and defining a drain board draining into said sink and in the other position forming a sink-cover and a loading-platform for the well.

9. In a counter-cabinet and in combination, an outer case substantially counter-high, said case being open at the top, a partition wall subdividing said case from front to back into adjoining compartments, a food storage well positioned in one of said compartments and accessible through the top thereof, the walls of said well being metallic, said well being of lesser dimensions than said compartment so that when said well is positioned in said compartment a chamber is formed extending from the walls of the well to the walls of the compartment, the top edges of the side and end walls of said well and the mating edges of the corresponding walls of said outer case terminating in oppositely spaced relation to each other to form a gap therebetween, a band of material of high thermal resistance positioned in and preventing conduction of heat across said gap, a length of metal tubing wrapped around said well and extending across the bottom thereof to form a refrigeration coil, the open ends of said tubular coil, extending through said partition wall into the adjoining chamber, heat insulating material covering said refrigeration coil and filling said chamber to substantially increase the thermal resistance thereof, the opening in the outer-case above said other compartment defining an opening for a sink, a compressor positioned beneath said sink-opening, pipes connecting the ends of said tubular coil with said compressor to provide a closed refrigeration system, the top edges of said well and of said sink-opening being substantially level, a hollow cover-member, the cavity in said cover-member being packed with heat insulating material, said cover-member being movable to alternatively overlie either the mouth of the well or the sink-opening, and said cover-member in one position thermally sealing the mouth of said well and defining a drain board draining into said sink-opening and in the other position covering the sink-opening to form a loading-platform for the well.

BERNARD ROBERTS.

REFERENCES CITED

The following references are of record in the file of this patent:

UNITED STATES PATENTS

| Number | Name | Date |
|---|---|---|
| 1,866,435 | Weinheimer | July 5, 1932 |
| 1,926,341 | Lipman | Sept. 12, 1933 |
| 2,328,130 | Earle | Aug. 31, 1943 |
| 2,432,397 | Earle | Dec. 9, 1947 |
| 2,446,322 | Benson | Aug. 3, 1948 |